United States Patent Office 3,320,244
Patented May 16, 1967

3,320,244
1,4-BENZOTHIAZINE ALDEHYDES
Gosta Brunnstrom, Somerville, N.J., assignor to American Cyanamid Company, Stamford, Conn., a corporation of Maine
No Drawing. Filed Mar. 9, 1964, Ser. No. 350,580
1 Claim. (Cl. 260—243)

This invention relates to new substituted 1,4-benzothiazine aldehydes represented by the Foruma I:

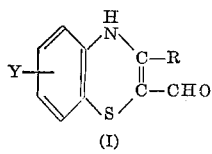

(I)

wherein R is a lower alkyl radical or an aryl radical of less than three 6-membered carbocyclic rings which may be substituted by a lower alkoxy or a halogen radical; and Y is hydrogen, lower alkyl, lower alkoxy or chloro.

The new compounds of this invention are colored products and are substantive to certain synthetic fibers, e.g., polyesters and superpolyamides, which they dye orange shades when applied by disperse dyeing methods.

The compounds may conveniently be prepared by the reaction of the formyl derivative of a methyl ketone (II) with an ortho-aminobenzenethiol (III) in a polar solvent (e.g., a lower alkanol such as ethanol) open to the atmosphere.

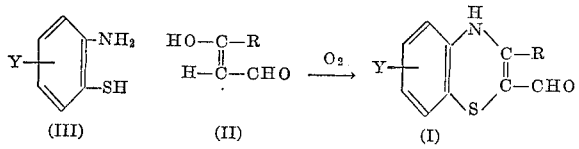

This involves an air oxidation in a ring-closure reaction. The starting formyl derivatives, which are known compounds, may be obtained by reaction of the methyl ketone with ethyl formate.

The time required for completion of the reaction may vary considerably depending on the particular starting materials used. Thus, the compounds of Formula I wherein R is lower alkyl, are obtained after several days standing at room temperature, open to the atmosphere; when R is aromatic, the time required is normally less than one day.

The compounds are colored and can be used as dyes for synthetic fibers.

The invention is further illustrated by the examples which follow.

EXAMPLE 1

*Preparation of 3-phenyl-2-formyl-4H-1,4-benzothiazine*

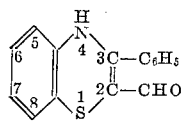

The formyl derivative of acetophenone is prepared first. Thus, to a slurry of 5.4 grams of sodium methoxide in 200 ml. of anhydrous diethyl ether maintained at about 20° C., was added gradually with stirring, a mixture of 12 ml. of acetophenone and 8 ml. of ethyl formate. After stirring for about six hours, 500 ml. of absolute ethanol and 11 ml. or ortho-aminobenzene thiol (ortho-aminothiophenol) were added. After standing at room temperature open to the atmosphere (two days), the crystals which formed were removed by filtration. After washing with ethanol, 6.5 parts of the desired product resulted; this may be recrystallized from the methyl ether of ethylene glycol to give a product with a melting point of 243° C. to 244° C.

By substituting various methyl ketones for the acetophenone in the preparation, corresponding substituted 1,4-benzothiazine aldehydes are prepared. These are listed with their melting points in the table which follows.

TABLE I.—3-R-2 FORMYL DERIVATIVES OF 1,4-BENZOTHIAZINE

| | R | M.p.² | Empirical Formula | Carbon, Percent | | Hydrogen, Percent | | Nitrogen, Percent | | Sulfur, Percent | |
|---|---|---|---|---|---|---|---|---|---|---|---|
| | | | | Calcd. | Found | Calcd. | Found | Calcd. | Found | Calcd. | Found |
| I | CH₃— | 252 | C₁₀H₉NSO | 62.8 | 62.6 | 4.7 | 4.8 | 7.3 | 7.4 | 16.8 | 17.1 |
| II | p-CH₃OC₆H₄— | 235 | C₁₆H₁₃NSO₂ | 67.8 | 68.1 | 4.6 | 4.8 | 4.9 | 4.5 | 11.3 | 11.4 |
| III | p-ClC₆H₄— | 288 | C₁₅H₁₀ClNSO | 62.6 | 63.0 | 3.5 | 3.7 | 4.9 | 5.3 | 11.1 | 11.4 |
| IV | β-C₁₀H₇ (naphthyl) | 242 | C₁₉H₁₃NSO | 75.3 | 75.0 | 4.3 | 4.2 | 4.6 | 4.6 | 10.6 | 10.6 |

The corresponding 6-chloro-2-formyl-3-phenyl, 7-methyl-2-formyl-3-phenyl and 7-ethoxy-2-formyl-3-phenyl derivatives are prepared by substituting 2-amino-4-chlorobenzenethiol, 5-methyl-2-aminobenzenethiol and 5-ethoxy-2-aminobenzenethiol, respectively, for ortho-aminobenzenethiol in the procedure of Example 1, and using acetophenone as the methyl ketone in the reaction.

EXAMPLE 2

A dye bath was prepared using 75 mg. of 3-phenyl-4H-1,4-benzothiazine-2-carboxaldehyde in 15 ml. of acetone, added to 100 ml. of water containing 2 ml. of a 5% aqueous solution of a dispersing agent. This dispersion was then added to 150 ml. of water. To a 50 ml. portion of the dispersion, diluted to 200 ml. with water, was added 3 ml. of a methyl salicylate dyeing assistant dispersion. A small skein of polyester was dyed from this bath at 200° F. for one hour. It was removed, rinsed and soaped at the boil 10 minutes using a 0.1% soap solution. After removing, rinsing and drying, the polyester was dyed orange.

EXAMPLE 3

A small piece of nylon fabric was dyed in a dye bath prepared by the procedure of Example 2, but without the methyl salicylate dispersing agent. The nylon was removed from the bath and dried without soaping. It was dyed an orange shade of color. When a small piece of cotton fabric was subjected to the dyeing procedure described above, no dyeing took place, and the cotton was not even stained. Since synthetic fibers are dyed whereas cotton is not even stained, these dyes also afford a method for distinguishing cotton from other fibers based on this differential dyeing property.

I claim:
A compound represented by the formula:

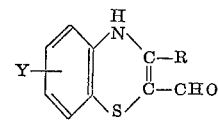

wherein R is a member selected from the group consisting of a lower alkyl radical and an aryl radical of less than three 6-membered carbocyclic rings, said rings having no substituents other than a member selected from the group consisting of lower alkoxy and halogen radicals; and Y is a member selected from the group consisting of hydrogen lower alkyl radicals, lower alkoxy radicals and chloro.

References Cited by the Examiner

UNITED STATES PATENTS 1,867,863   7/1932   Muth _____ 260—243

WALTER A. MODANCE, *Primary Examiner.*

JOHN M. FORD, *Assistant Examiner.*